United States Patent [19]
Rabe

[11] Patent Number: 5,120,279
[45] Date of Patent: Jun. 9, 1992

[54] STRUCTURAL BEARING ELEMENT

[75] Inventor: Jürgen Rabe, Aurachtal, Fed. Rep. of Germany

[73] Assignee: INA Walzlager Schaeffler KG, Fed. Rep. of Germany

[21] Appl. No.: 453,702

[22] Filed: Dec. 20, 1989

Related U.S. Application Data

[62] Division of Ser. No. 208,892, Jun. 17, 1988, abandoned.

[30] Foreign Application Priority Data

Jul. 3, 1987 [DE] Fed. Rep. of Germany ....... 3722052

[51] Int. Cl.$^5$ .............................................. F16H 55/48
[52] U.S. Cl. .................................. 474/161.0; 474/190; 474/197; 264/46.7
[58] Field of Search .................. 264/46.7, 46.9; 428/319.1, 319.3, 319.7, 319.9; 474/161, 174, 190, 192, 195, 197

[56] References Cited

U.S. PATENT DOCUMENTS

| | | | |
|---|---|---|---|
| 3,978,181 | 8/1976 | Vahle | 264/46.7 |
| 3,991,146 | 11/1976 | Barrie | 264/46.7 |
| 4,217,944 | 8/1980 | Pascal | 152/323 |
| 4,571,226 | 2/1986 | Molloy et al. | 474/190 |
| 4,707,408 | 11/1987 | Iwasawa et al. | 428/379 |
| 4,717,370 | 1/1988 | Röhrig | 474/161 |
| 4,722,722 | 2/1988 | Rampe | 474/161 |
| 4,820,246 | 4/1989 | Allen | 474/190 |

Primary Examiner—Terry L. Melius
Attorney, Agent, or Firm—Bierman and Muserlian

[57] ABSTRACT

A plastic element with an outer surface defining a running surface, particularly for a belt or chain, arranged at the outer circumference of a metallic insert designed as a rolling or sliding bearing, consisting of a polymeric plastic material hardened after polymerization produced in a mold comprising adding an expanding agent to the polymeric plastic material by mixing, inserting the metallic insert into the mold, filling the mold with polymeric plastic material containing an expanding agent at a low pressure compared to injection molding pressures, allowing the polymeric plastic material to expand by action of the expanding agent to the outer surface of the metallic insert and to the mold to form the running surface and hardening the polymer plastic material.

8 Claims, 1 Drawing Sheet

STRUCTURAL BEARING ELEMENT

PRIOR APPLICATION

This application is a division of U.S. patent application Ser. No. 208,892 filed on Jun. 17, 1988, now abandoned.

STATE OF THE ART

Methods of making a plastic element with an outer surface defining a running surface, particularly for a belt or a chain, arranged at the outer circumference of a metallic insert designed as a rolling or sliding bearing, and made in a mold of a polymeric plastic material hardened after polymerization are known. In a method of this kind, after the insert for example the rolling contact bearing is incorporated into the mold, the plastic material is pressed into the mold at a very high injection and molding pressure such as for example, approximately 800 bar to 1500 bar. This pressure must be absorbed by the outer ring which may deform under the high injection and molding pressure, especially when the wall thickness of the outer ring is small because of construction requirements. Moreover, the Hertzian stress between the running surface and the rolling elements may be of a magnitude for exceeding the admissible loading capacity and this must be avoided. When embedding the outer ring of a rolling contact bearing or a slide bushing in a polymeric plastic material, the latter shrinks during hardening as known per se. Because of the shrinkage, a considerable pressure is exerted on the outer circumference. This, too, may deform the outer ring or the slide bushing or damage the tracks.

It would be possible to make the plastic element in which the insert should be embedded as a separate structural element and to connect the latter with the insert so that this connection will not exert an excessive load on the bearing. This, however, is complicated and uneconomic.

DE-OS 3,239,334 describes another method in which an insert of plastic material is cast or injected between a metallic bearing ring and a metallic shaft. The bearing and not the insert defines the outer surface of the structural element and the inner circumference as well as the outer circumference of the insert define the bearing surfaces. The insert should permanently connect the bearing ring and the shaft and should compensate for the shrinkage during the course of the aging. For that purpose, a blowing agent is added to the insert which generates expansive forces in the insert during the time of use. Thus, the insert is not hard after polymerization. As the insert shrinks during the polymerization, the bearing ring will not be overloaded since it bears against the outer bearing surface of the insert and the shaft which bears against the inner bearing surface can absorb the forces of shrinkage.

OBJECTS OF THE INVENTION

It is an object of the invention to provide a method of the above-stated kind in which the pressure build up is obtained so that the insert will not be subjected to inadmissibly high stress.

It is another object of the invention to provide a structural element in which a plastic portion enclosing the outer circumference of an insert does not subject the insert to inadmissible high stress.

These and other objects and advantages of the invention will become obvious from the following detailed description.

THE INVENTION

The plastic element of the invention with an outer surface defining a running surface, particularly for a belt or chain, arranged at the outer circumference of a metallic insert designed as a rolling or sliding bearing, consisting of a polymeric plastic material hardened after polymerization produced in a mold is produced by adding an expanding agent to the polymeric plastic material by mixing, inserting the metallic insert into the mold, filling the mold with polymeric plastic material containing an expanding agent at a low pressure compared to injection molding pressures, allowing the polymeric plastic material to expand by action of the expanding agent to the outer surface of the metallic insert and the mold to form the running surface and hardening the polymeric plastic material. During the introduction of the plastic material, there is no pressure which could deform the insert and thus, a rolling contact bearing with a comparably weak outer ring can be embedded in the plastic material.

The expanding agent provides in the closed mold the internal mold pressure required for shaping the plastic element and its connection with the insert and the internal mold pressure does not damage the insert. The required amount of expanding agent is low, in any event lower than for a foaming method. By dimensioning the amount of expanding agent, the maximal admissible internal mold pressure is adjustable for the outer ring and the inner ring. The plastic material shrinks during hardening and the pressure acting on the insert is reduced in the plastic material by the micropores obtained by the expanding agent. A shrinkage of the running surface is permitted and innocuous.

The plastic portion has high strength properties and is abrasion-proof and wear-resistant and it is solidly connected with the insert. The plastic portion may be thick-walled in comparison to the insert and the plastic portion is suitable for example as belt tensioning roller, with the insert being the integral part.

The structural element of the invention in which a plastic portion encloses the outer circumference of a metallic insert, with the outer surface of the plastic portion defining the running surface is characterized in that the plastic portion contains pores and that the plastic portion is shrunk to the outer circumference.

Referring now to the drawings.

Figure 1:
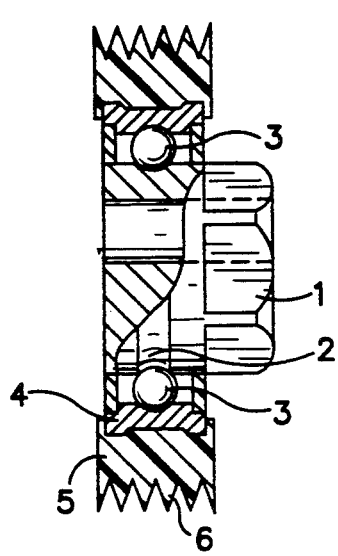
FIG. 1 is a cross-sectional view of a belt tensioning roller.

The belt tensioning roller has a fastening bolt (1) which is provided at its outer surface with a track (2) for rolling elements (3) which rest in an outer ring (4). The outer ring (4) is an insert embedded in form-locking manner in a plastic portion (5) provided at its outer circumference with a running surface (6) which is defined in this case by a multiple toothing to ensure the guidance of a belt with multiple V-shape. Thus, a poly-V-belt roller is concerned and further examples of application at the outer circumference are toothed belt rollers or V-belt rollers.

In the embodiment according to FIG. 1, the plastic portion (5) as a result of the expanding agent has pores within the plastic material which forms the plastic element (5) which is shrunk to the outer ring (4). In the embodiment according to FIG. 2, the plastic element (5) includes an inner portion (7) and an outer portion (8) surrounding the inner portion. Only the inner portion (7) includes pores as a result of the expanding agent. In the embodiment of FIGS. 3 and 4, the outer portion (8) additionally includes spoke-like ribbings (9) which are connected to the ring (10) extending about the outer ring (4).

Figure 2:
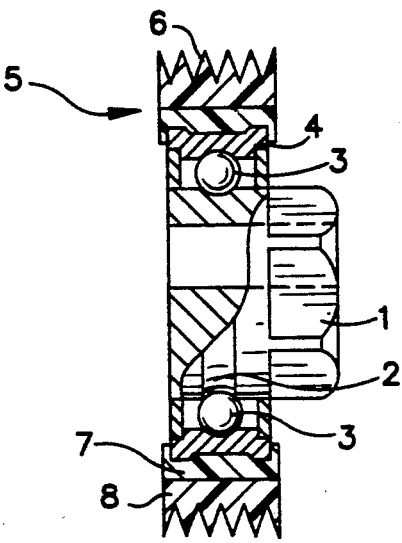
FIG. 2 is a second embodiment.
Figure 3:
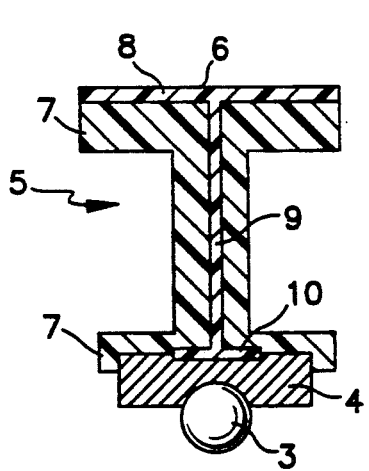
FIG. 3 is a partial cross-sectional view of a further embodiment.
Figure 4:
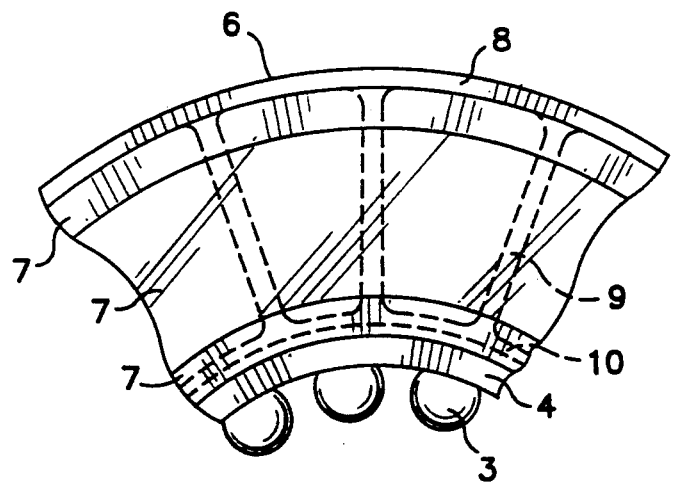
FIG. 4 is a partial view of the embodiment of FIG. 3.

The plastic element (5) of FIG. 1 or its inner portion (7) of FIGS. 2 to 4 is made, for example, of a high-strength, reinforced plastic material such as polyamide 66 with 30% by weight of a glass-fiber reinforcement. The plastic element (5) of FIG. 1 or its outer portion (8) of FIGS. 2 to 4 is made, for example, of an abrasion-proof, unreinforced plastic material like polyoxymethylene (POM) or polyurethane (PUR). Polybutylene terephthalate may also be used. The hardeness of the plastic element (5) is equal to or greater than 60 Shore A. In tightening roller and not driving rollers, the outer portion is designed in friction-promoting manner.

The plastic element (5) of FIG. 1 is made at the outer ring (4) by the following method. The bearing consisting of fastening bolt (1), rolling elements (3) and outer ring (4) is inserted and centered in a mold. A plastic material containing an expanding agent is then introduced into the mold. The amount of expanding agent ranges between 0.001 to 4% by weight, preferably between 0.15 and 1.5% by weight, based on the plastic material. The plastic material is introduced at a comparably low pressure of 10 bar to 60 bar and at this pressure, there is no danger that the outer ring (4) will deform or that the rolling elements are overloaded at the tracks. The mold is closed and the ventilation is attained via common vent channels.

Then, the expanding agent becomes effective and micropores develop in the plastic material thereby urging the latter for formation of the running surface (6) against the mold and against the outer circumference of the outer ring (4). The plastic material then hardens, with the plastic material shrinking during hardening. The pressure thus being exerted on the outer ring (4) is comparably small because the micropores are compressed during shrinking. A shrinkage of the running surface (6) is irrelevant.

It is not common to use an expanding agent during plastic embedding of such bearings. By using the expanding agent, it is achieved that during the introduction of the plastic material and during its shrinkage, only a small pressure is exerted on the outer ring (4) so that the latter may be suitably designed in thin-walled manner.

The method of making the structural element of FIG. 2 is as follows: After centering the structural unit consisting of fastening bolt (1), rolling element (3) and outer ring (4) in the mold, the plastic material forming the outer portion (8) of the plastic element (5) is initially introduced and this plastic material does not contain any expanding agent. After introducing the plastic material of the outer portion (8), the plastic material forming the inner portion (7) is fed into the mold and this plastic material contains the expanding agent in an amount in the above stated range. It is, however, certainly conceivable to introduce first the plastic material forming the inner portion (7) and then the plastic material forming the outer portion (8).

The expanding agent becomes effective within the mold and forms micropores within the inner portion (7) which urge the plastic material portions against the mold. Through the formation of the micropores, the plastic material of the inner portion (7) is also pressed against the outer ring (4). Then, the plastic material hardens and the resulting shrinkage leads to a tight shrinking of the inner portion (7) to the outer ring (4) and of the outer portion (8) to the inner portion (7). However, the outer ring (4) is not overloaded by the pressure acting thereon because the micropores within the inner portion (7) lead through their compression to a reduction of the pressure acting on the outer ring (4).

The structural element of FIGS. 3 and 4 can be made as follows: After centering the rolling contact bearing consisting of the outer ring (4), the elastic plastic material containing no expanding agent and forming the outer portion (8), the spoke-like ribs (9) and the ring (10) is initially injected. Then, the plastic material containing expanding agent and forming the inner portion (7) is introduced and during its foaming, the shrinkage of the outer portion (8) is counteracted so that no undesired pressure is exerted on the outer ring (4).

It is also possible to make the outer portion (8) which defines the running surface for a belt to be tightened, as a prefabricated part together with the spoke-like ribbing (9) and the ring (10) which prefabricated part is then slid with the ring (10) onto the outer ring (4). Then, the plastic material forming the inner portion (7) is injected about this part and the outer ring (4).

In case the plastic element (5) is made of two different materials (compare FIGS. 2 to 4), a forming-locking connection or a connection in heat elastic state may be provided. In the latter case, the melting point of the initially injected plastic material should be the same or lower than that of the subsequently injected plastic material.

The described methods are applicable also in structural parts other than the belt tightening roller. Through the provision of the method, a plastic element can be made with a comparably thin-walled outer ring of a rolling contact bearing or a slide bushing with an outer diameter which is substantially greater than that of the outer ring or the slide bushing.

Various modifications of the method and elements of the invention may be made without departing from the spirit or scope thereof and it should be understood that the invention is intended to be limited only as defined in the appended claims.

I claim:

1. A structural element comprising a plastic element enclosing an outer circumference of a metallic insert designed as an outer ring of a rolling bearing or as a bushing of a sliding bearing with the outer surface of the plastic element defining a running surface with a grooved or toothed profile, wherein the structural element is produced by the following steps inserting the metallic insert into a mold which is then closed, mixing the polymeric material, from which the plastic element is fabricated with an expanding agent, filling the polymeric material into the closed mold where it is allowed to expand and polymerize, characterized in that the plastic element contains micropores and has a hardness of at least 60° Shore A and that the plastic element is shrunk to the metallic insert.

2. An element of claim 1 wherein the plastic element has an inner portion provided with micropores and an outer portion free of pores.

3. An element of claim 2 wherein the outer portion defining a belt running surface is made of an abrasion-proof, unreinforced plastic material and the inner portion is made of a high-strength, reinforced plastic material.

4. An element of claim 2 wherein the elastic support is defined by a ring cooperating with radially extending ribs which are particularly in the form of spokes.

5. An element of claim 2 wherein the outer portion defining a belt running surface is made of an abrasion-proof, unreinforced plastic material and the inner portion is made of a high-strength, reinforced plastic material.

6. An element of claim 2 provided with an elastic support extending within the inner portion and between the outer portion and the outer circumference of the metallic insert.

7. An element of claim 6 wherein the outer portion and elastic support are formed as a prefabricated element slid over the outer circumference of the metallic insert and injection molded with the inner portion.

8. An element of claim 6 wherein the elastic support is defined by a ring cooperating with radially extending ribs which are particularly in the form of spokes.

* * * * *